United States Patent [19]

Reilly et al.

[11] 3,935,329

[45] Jan. 27, 1976

[54] METHOD OF MANUFACTURING NEW PAINTABLE RUBBER PRODUCTS

[75] Inventors: Albert F. Reilly, Howell, Mich.; Ivan C. Doddridge, Virginia Beach, Va.; Ming Chih Chen, St. Clair Shores, Mich.

[73] Assignee: Sheller-Globe Corporation, Toledo, Ohio

[22] Filed: Jan. 27, 1975

[21] Appl. No.: 544,219

Related U.S. Application Data

[63] Continuation-in-part of Ser. No. 358,514, May 9, 1973, Pat. No. 3,873,348.

[52] U.S. Cl. .............. 427/35; 427/54; 427/223; 427/322; 427/407; 428/492; 428/521
[51] Int. Cl.² ...................... B05D 3/06; B05D 3/12
[58] Field of Search ............ 427/322, 407, 35, 54; 260/33.6 AQ; 264/129; 428/411, 492, 521

[56] References Cited
UNITED STATES PATENTS

| | | | |
|---|---|---|---|
| 2,873,215 | 2/1959 | Quigley et al. | 427/388 |
| 3,003,893 | 10/1961 | Metz | 427/388 |
| 3,231,410 | 1/1966 | Huber et al. | 428/462 |
| 3,511,685 | 5/1970 | Rentschler | 427/322 |
| 3,528,848 | 9/1970 | Zoebelein | 260/2.5 |
| 3,577,261 | 5/1971 | Klar | 427/399 |
| 3,623,900 | 11/1971 | Jonnes et al. | 428/194 |
| 3,697,306 | 10/1972 | Miller | 8/4 |
| 3,709,848 | 1/1973 | Gerstin et al. | 260/33.6 |
| 3,764,370 | 10/1973 | Bragole | 427/54 |
| 3,766,124 | 10/1973 | Tompkins | 260/33.6 |

FOREIGN PATENTS OR APPLICATIONS

| | | | |
|---|---|---|---|
| 561,036 | 7/1958 | Canada | 427/322 |

*Primary Examiner*—Harry J. Gwinnell
*Assistant Examiner*—Sadie L. Childs
*Attorney, Agent, or Firm*—Harness, Dickey & Pierce

[57] ABSTRACT

A new paintable rubber composition made of a special formulation of materials including, for example, an SBR rubber elastomer and a thermoplastic polymeric stiffening agent means which may be used to provide the cured composition with a high flex modulus; and a new method of manufacturing a special flexible painted rubber product comprising molding, curing and painting said product.

29 Claims, No Drawings

3,935,329

METHOD OF MANUFACTURING NEW PAINTABLE RUBBER PRODUCTS

BACKGROUND OF THE INVENTION

This application is a continuation-in-part relative to copending application Ser. No. 358,514, filed May 9, 1973 now U.S. Pat. No. 3,873,348.

This invention relates to a paintable rubber product for use on automotive vehicles and the like. Also, the invention broadly relates to a new rubber composition and a method of manufacturing products therewith.

The state of the art is indicated by the following references and the references cited in said copending application above: U.S. Pat. Nos. 3,231,634; 3,256,362; 3,511,792; 3,577,480; and, Enjay Chemical Company Technical circular, EPL-7204, for "Vistalon Formula 11.401—A New Paintable Base Compound"; and, Copolymer Rubber and Chemical Corporation, Technical circular entitled "EPsynEPDM . . . The Paintable EPDM you compound yourself"; and, DuPont Technical circular for DuPont's Nordel No. 2903, EPDM System.

One object of this invention is to prepare a new paintable rubber product with a colored paint coating thereon, said coating being of a flexible, color stable nature and with said product having a high flex modulus, and also possessing the properties of being resilient and generally recoverable to its original shape after deflection.

Another object of this invention is to provide a new rubber composition and method of manufacturing products therewith.

Another object of this invention is to provide a new rubber composition and product which are more economical from a cost standpoint.

Another object of this invention is to provide a new rubber composition and product wherein the curing rates are faster thus allowing faster cycle times than were generally possible with prior compositions (i.e., faster but yet color stable when painted).

Another object of the present invention is to provide a new rubber composition and product wherein the flow characteristics of the composition are better suited for molding or extruding a product to be manufactured.

Another object of the present invention is to provide a new system for manufacturing a paintable rubber product wherein ultraviolet surface activation is not necessary in order to achieve good paint adhesion.

Other objects, features and advantages of the present invention will become apparent from the subsequent description and the appended claims.

SUMMARY OF THE INVENTION

Briefly stated, the present invention concerns a method of manufacturing a paintable rubber product for automotive vehicles or the like, comprising, percentages being by weight, (a) about 15 to about 90% of a cross-linkable rubber material selected from at least one of the group consisting of styrene butadiene rubber, polybutadiene rubber, and isoprene rubber, said rubber material also including up to 50% of ethylene-propylene diene monomer rubber or neoprene rubber, (b) about zero to about 40% of a thermoplastic polymeric stiffening agent means for providing a high flex modulus for the product and being selected from at least one of the group consisting of an ethylene-ethyl acrylate copolymer, acrylonitrile butadiene styrene, polyvinyl chloride, ethylene vinyl acetate, a thermoplastic ethylenepropylene copolymer, an acrylic resin, a cellulosic resin, and a $C_2$–$C_4$ polyolefinic polymer material, (c) 0.01 to about 50% of a plasticizing agent, (d) zero to about 5% of an accelerating agent, (e) 0.01 to about 10% of a curing agent, (f) zero to about 10% of an activating agent, (g) zero to about 80 % of a filler material, and a colored paint coating layer means on said product operative to provide a desired color and made of a flexible color stable paint.

In at least one method aspect, this invention concerns manufacturing a new flexible paintable rubber product by the steps of: formulating a composition comprising, percentages being by weight, (a) about 15 to about 90% of a cross-linkable rubber material selected from at least one of the group consisting of styrene butadiene rubber, polybutadiene rubber, and isoprene rubber, said rubber material also including less than 50% of ethylene-propylene diene monomer rubber or neoprene rubber, (b) zero to about 40% of a thermoplastic polymeric stiffening agent means for providing a high flex modulus for the cured composition, (c) 0.01 to about 50% of a plasticizing agent, (d) zero to about 5% of an accelerating agent, (e) 0.01 to about 10% of a curing agent, (f) zero to about 10% of an activating agent, (g) 0.01 to abut 80% of a filler material, and forming the product by molding said composition and curing the product at a temperature between about 275° and about 600° F (preferably 300°–450° F) for a time period between about 45 minutes and about ¼ minute (preferably about ½–20 minutes) preparing a clean surface on the molded product, applying a flexible color stable colored paint coating to the product.

DESCRIPTION OF THE PREFERRED EMBODIMENTS

The cross-linkable rubber material used in the invention should be selected from the group of styrene butadiene rubber (SBR), polybutadiene, and isoprene rubber. The cross-linkable rubber material may also optionally include up to 50% of ethylene-propylene diene monomer rubber (EPDM) or neoprene rubber. Preferably, though, the inclusion of this optional EPDM or neoprene rubber material in the cross-linkable rubber material referred to above is maintained at a level below 15% by weight of the cross-linkable rubber material and best results appear to be obtained without the presence of any EPDM or neoprene rubber.

The amount of said cross-linkable rubber material should broadly be between about 15 and about 90% by weight of the composition and preferably it should be between about 25 and 60% of the composition, with best results being obtained within the range of about 30 to about 55% by weight of the composition.

The thermoplastic polymeric stiffening agent means in accordance with this invention has been discovered to provide a high flex modulus for the cured composition or final product formed and this polymeric stiffening agent means is one selected from the group consisting of ethylene-ethyl acrylate copolymer, acrylonitrile butadiene styrene, styrene resins, polyvinyl chloride, ethylene vinyl acetate, a thermoplastic ethylene-propylene copolymer, an acrylic resin, a cellulosic resins, phenolic resins and a $C_2$–$C_4$ polyolefinic polymer material. This stiffening agent may also be made at least in part from a $C_2$–$C_4$ polyolefin/acrylic copolymer material.

The amount of the polymeric stiffening agent means present in the composition should broadly be within the range of zero – 40% by weight of the composition and preferably it should be maintained within the range of about 0.01 up to about 40% by weight of the composition, with best results being obtained when it is maintained within the range of about 5 to about 20% by weight of the composition.

The plasticizing agent utilized in the composition should be present within the broad range of about 0.01 up to about 50% by weight of the composition, and preferably, it should be maintained in the range of 0.01 up to about 35% by weight of the composition, with best results being obtained using the plasticizing agent within the range of about 1 to about 15% by weight. The plasticizing agent should be a compatible non-staining, non-discoloring plasticizer such as the various plasticizing oils, for example, Flexon 766 or Sunthene 410; or, various other high quality naphthenic oils or various parafinic materials, or various low molecular weight polyester plasticizers, as well as petroleum resins and cool tar compounds (coumarone indenes) may also be used. Other plasticizers which may be used in this invention are disclosed in commonly assigned co-pending application Ser. No. 135,787, filed Apr. 20, 1971, now abandoned, the disclosure of which is hereby incorporated herein by reference.

The accelerating agent used in the composition should broadly be present within the range of about zero up to about 5% by weight of the composition, and preferably, it should be present within the range of about zero to about 3% by weight, with best results being obtained in the range of about 0.01 up to about 3%. The accelerating agents which are useful herein are of a type well known in the art, such as cumate, altax, captax and various methacrylate monomers (e.g., Sartomer Co. SR-206, 297, and 350).

The curing agent used in the composition should broadly be within the range of about 0.01 to about 10% by weight of the composition and, preferably it should be within the range of about 0.5 to about 5%, with best results being obtained when it is maintained within the range of about 0.5 to about 3% by weight of the composition. The composition may be sulfur cured or cured with a peroxide curing agent or numerous other curing agents may be used such as Schenectady SP-1055 curing agent (brominated methyol phenol type, see U.S. Pat. No. 2,972,600), a phenol curing agent, a quinone curing agent, or an amino type curing agent.

The activating agent used in the composition should be present within the broad range of about zero up to about 10% by weight of the composition and preferably, it should be present within the range of about 0.01 to about 5% by weight, with best results being obtained within the range of about 0.1 to about 3% by weight of the composition. The activating agent may be a material such as zinc oxide, stearic acid, various stearates such as zinc stearate, and various metallic halides. Numerous different activating agents may be useful in the invention which activating agents are known in the art.

The filler material which may optionally be included in the composition may be present within the broad range of about zero up to 80% by weight of the composition, and preferably, it should be maintained within the range of at least about 0.01 up to about 80% by weight of the composition, with best results being obtained when a filler material is used within the range of about 1 to about 50% by weight of the composition. Any non-discoloring filler material may be used such as various carbons, carbon black, various carbonate fillers, clays, sulfates, various silicas, fiber glass, and other fibrous materials. Other filler materials will be apparent to those skilled in the art.

The cured composition discovered and disclosed in accordance with the invention herein finds highly satisfactory and advantageous uses, such as for paintable rubber sightshield products in the automotive field, for various bumper products in the automotive field, for fender extensions, filler panels, hoods, trunk lids, and the like all in the automotive vehicular field. Numerous other highly useful applications of this invention may be found where an exteriorly used flexible paintable rubber product is required.

After the composition is molded and cured as referred to above, it is generally prepared for painting by cleaning the surface thereof which is to be painted either with solvents or a detergent wash or otherwise properly cleaning the surface. Then generally we have found that the surface to be painted should be properly activated to obtain good paint adhesion in accordance with our invention. The surface activation may be carried out by halogenation of the surface such as by chlorination, or by ozone treatment, treatment with ultraviolet light, flame treatment, or electronic treatment. In certain instances surface activation is not necessary with some flexible color stable paints which may be used on the cured molded composition in accordance with our invention. It is to be noted in accordance with this invention that ultraviolet treatment of the surface is not necessary and that the surface may be prepared in a very able fashion to obtain good paint adhesion by chlorination of the surface to be painted.

After the surface is prepared for painting, it is our finding that generally a paint primer coating should preferably first be applied although this is optional and not absolutely necessary. Then a colored paint coating layer means is applied to the product using a flexible color stable paint coating such as a paint selected from the group of resinous coatings consisting of a urethane resin coating, an acrylic resin coating, or a polyester resin coating or combinations thereof. Application of these coatings may be by spraying, brushing, rolling, electrostatic application of the like. As mentioned, the application of a primer coating is not absolutely necessary. However, it is generally more economical to use a primer coating because the application of a thicker colored paint coating which would be necessary without a primer coating requires the application of a thick paint coating which has an expensive coloring pigment system therein.

It should also be understood that in accordance with the invention herein, it is possible to carry out the forming step continuously such as by extruding, and the steps of curing, preparing the clean surface, and applying the color stable paint coating may all be carried out continuously in a continuous manufacturing operation. Moreover it is also possible to include a textured surface pattern in the product (e.g., for weatherstrips) by continuously rolling in a textured pattern on the product after it has been formed and prior to curing.

The advantages of the invention should be fairly apparent from the inventive disclosure above. However, it is believed in particular that the following advantages are obtainable with this invention: (1) The new rubber product herein is quicker curing and thus the mold cycle times are reduced. (2) The new rubber product herein is generally more economical because less costs are involved in obtaining the raw materials used in this invention. (3) Better processability is obtained using the new rubber composition herein. (4) With the new rubber composition herein, it is generally easier to get proper adhesion with the overlying paint layers. (5) With the new composition herein, the final product properties are either equivalent to or better than prior compositions. (6) With the new composition herein, improved weatherability of paints on the product substrate is obtainable. (7) The rubber composition and system of manufacturing a paintable rubber product in accordance with this invention does not require ultraviolet treatment of the surface of the cured rubber composition in order to achieve good paint adhesion. (8) In prior compositions based on EPDM rubber, these prior compositions have generally possessed relatively high viscosities such cause undesireable flow properties in molding, whereas the composition of this invention possesses much improved flow properties and thus the composition and product of this invention are much better suited for molding than the prior compositions. (9) Moreover, as explained herein the manufacture of products pursuant to this invention may be carried out on a continuous basis.

In order to further illustrate the invention, the following examples are provided. It is to be understood, however, that the examples are included for illustrative purposes and are not intended to be limiting of the scope of the invention as set forth in the subjoined claims.

EXAMPLE 1

| Material | Parts | % wgt. |
|---|---|---|
| SBR 1502 | 75 | 40 |
| DPD 6169 | 25 | 13.5 |
| (ethylene ethyl acrylate) | | |
| FEF Black | 70 | 37.5 |
| Sunthene 410 | 8 | 4.3 |
| (naphthenic processing oil) | | |
| Zinc Oxide | 3 | 1.6 |
| Zalba Special | 0.5 | .27 |
| (antioxidant) | | |
| Stearic acid | 0.5 | .27 |
| Cumate | 0.1 | .0054 |
| Altax | 2.0 | 1.07 |
| Spider Sulfur | 2.0 | 1.07 |
| TE 28E | 0.5 | .27 |
| (Technical Processing Inc., organic processing aid) | | |
| TOTAL | 186.6 | |
| Specific gravity | 1.18 | |

EXAMPLE 2

| Ingredients | Parts |
|---|---|
| Ameripol 1502 (SBR rubber) | 75.0 |
| DPD 6169 | 25.0 |
| FEF Black | 70.0 |
| 766 Oil (Flexon) | 8.0 |
| ZNO | 3.0 |
| Zalba Special | 0.5 |
| Stearic Acid | 0.5 |
| Cumate | 0.1 |
| MBTS | 2.0 |
| (accelerator-benzo thiazyl disulfide) | |
| Sulfur | 2.0 |
| TE 28-E | 0.5 |
| CaO | 2.0 |
| Specific gravity - 1.18 | |

EXAMPLE 3

| Ingredients | Parts | |
|---|---|---|
| SBR 1502 | 15 | |
| SBR 8140 | 35 | |
| EPDM (EPSYN 4506) | 50 | |
| Goodrite Resin 2007 | 25 | |
| (a high styrene SBR polymer) | | |
| 550 FEF Carbon Black | 100 | |
| Sunpar 140LW oil | 26 | |
| Zinc oxide | 3 | |
| Carbowax 4000 | 0.5 | |
| (polyethylene glycol) | | |
| Hi Sil 233 | 10 | |
| Vulkup 40KE | 3 | |
| (organic peroxide) | | |
| Cure (Min./Temp.) | 3/350°F | 6/350°F |
| Duro A & D | 86/35 | 90/37 |
| Tensile | 1090 | 1320 |
| 100% Modulus | 1090 | — |
| Elongation | 100 | 70 |
| Tear | 93 | 95 |

EXAMPLE 4

| Ingredients | Parts | |
|---|---|---|
| SBR 1502 | 25 | |
| SBR 8140 | 25 | |
| EPDM (EPSYN 4506) | 50 | |
| 550 FEF Carbon Black | 100 | |
| Sunpar 140LW oil | 25 | |
| Zinc oxide | 3 | |
| Carbowax 4000 | 0.5 | |
| Hi Sil 233 | 10 | |
| SP 1055 Resin | 15 | |
| (a brominated methylol phenolic resin) | | |
| Cure (Min./Temp.) | 5/380°F | 10/350°F |
| Duro A | 79 | 78 |
| Tensile | 1190 | 1170 |
| 100% Modulus | 890 | 820 |
| Elongation | 160 | 180 |
| Tear | 113 | 113 |

EXAMPLE 5

| Ingredients | Parts |
|---|---|
| SBR 1502 | 75.0 |
| DPD 6169 | 35.0 |
| FEF 550 | 70.0 |
| Sunthene 410 | 8.0 |
| ZnO | 3.0 |
| Stearic Acid | 0.5 |
| Zalba Special | 0.5 |
| Cumate | 0.1 |
| Altax | 2.0 |
| Spider Sulfur | 2.0 |
| TE-28-E | 0.5 |
| Mooney Scorch/280°F | |
| Minimum | 18 |
| T 10 | 9.5 |
| Mooney Scorch/250°F | |
| Minimum | 20.0 |
| T 10 | 23.0 |
| Cure time (Min./Temp.) | 35/350°F |
| Hot Tear | Excellent |
| Snap | Excellent |
| Durometer A | 82 |
| 100% Modulus | 1000 |
| Tensile | 2200 |
| Elongation | 240 |
| Tear | 225 |

EXAMPLE 6

| Ingredients | Parts |
|---|---|
| SBR 8140 | 49 |
| SBR 1006 | 21 |

EXAMPLE 6-continued

| Ingredients | Parts |
| --- | --- |
| EPDM (EPSYN 55) | 30 |
| 500 FEF Carbon Black | 75 |
| Austin Black | 15 |
| Sunpar 140 LW oil | 12 |
| Zinc oxide | 3 |
| SP 1055 Resin | 15 |
| ¼" chopped strands fiberglas | 44 |
| Cure (Min./Temp.) | 75/350°F |
| Duro A | 84 |
| Tensile | 1640 |
| 100% Modulus | 970 |
| Elongation | 230 |
| Tear | 273 |

EXAMPLE 7

| Ingredients | Parts |
| --- | --- |
| SBR 1708 | 85 |
| EPDM (EPSYN 55) | 15 |
| 550 FEF Carbon Black | 90 |
| Sunpar 140 LW oil | 25 |
| Zinc oxide | 5 |
| Calcium oxide dispersion | 5 |
| Stearic acid | 1.5 |
| Zalba Special (an antioxidant) | 0.5 |
| Cumate (copper dimethyl-dithio-carbarate) | 0.1 |
| Altax (mercapto-benzothiazole-disulfide | 2.8 |
| Sulfur | 2.0 |
| Cure (Min./Temp.) | 2.5/350°F |
| Duro A | 75 |
| Tensile | 1010 |
| Elongation | 130 |
| Tear | 120 |

EXAMPLE 8

| Ingredients | Parts |
| --- | --- |
| SBR 1708 | 70 |
| EPDM (EPSYN 55) | 30 |
| 550 FEF Carbon Black | 90 |
| Sunpar 140LW oil | 25 |
| Zinc oxide | 5 |
| Calcium oxide dispersion | 5 |
| Stearic acid | 1.5 |
| Zalba Special | 0.5 |
| Cumate | 0.1 |
| Altax | 2.8 |
| Sulfur | 2.0 |

EXAMPLE 9

| Ingredients | Parts |
| --- | --- |
| SBR 1519 | |
| Copo 1815 | 137.0 |
| Epsyn 55 | 35.0 |
| Statex M FEF | |
| SRF 774 | 60.0 |
| Sunthene 410 | |
| DPD 6169 | 15.0 |
| Zalba Special TE-80 | 0.1 |
| Stearic Acid | |
| ZnO | 5.0 |
| Cumate | 0.2 |
| Altax | 2.8 |
| Spider Sulfur | 2.5 |
| Mooney Scorch/280° F | |
| Minimum | 35 |
| T 10 | 9.0 |
| Press Cure (Min./Temp.) | 3/350 |
| Snap | Excellent |
| Durometer A | 80 |
| Tensile | 1700 |

EXAMPLE 9-continued

| Ingredients | Parts |
| --- | --- |
| 100% Modulus | 1050 |
| Elongation | 170 |
| Tear | 128 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method of manufacturing a flexible paintable rubber product, comprising the steps of:
    formulating a composition comprising, percentages being by weight,
    a. about 15 to about 90% of a cross-linkable rubber material selected from at least one of the group consisting of
        styrene butadiene rubber, polybutadiene rubber, and isoprene rubber,
        said rubber material also including less than 50% of ethylene-propylene diene monomer rubber or neoprene rubber,
    b. about 0.01 to about 40% of a polymeric stiffening agent for providing a high flex modulus for the cured composition,
    c. about 0.01 to about 50% of a plasticizing agent,
    d. zero to about 5% of an accelerating agent,
    e. 0.01 to about 10% of a curing agent,
    f. zero to about 10% of an activating agent,
    g. zero to about 80% of a filler material,
    forming the product by molding said composition and curing the product at a temperature between about 275° and about 450° F for a residence time period between about 20 minutes and about ½ minute, preparing a clean surface on the molded product, applying a flexible color stable colored paint coating to the product.

2. The method of claim 1 wherein,
    said preparing of a clean surface includes activating the surface to be painted by a surface treatment selected from at least one of the group consisting of halogenation treatment, ozone treatment, ultraviolet treatment, electronic treatment or flame treatment.

3. The method of claim 1 wherein,
    said preparing of a clean surface includes activating the surface to be painted by a surface treatment selected from the group consisting of chlorination treatment, ozone treatment, electronic treatment or flame treatment.

4. The method of claim 2 wherein,
    said treatment is by chlorination.

5. The method of claim 1 wherein,
    said rubber material includes less than 15% of ethylene-propylene diene monomer, rubber or neoprene rubber.

6. The method of claim 1 wherein,
    component (b) is present from about 0.01 to about 25%,
    component (c) is present from about 0.01 to about 35%,
    component (d) is present from about zero to about 3%, component (e) is present from about 0.05 to about 5%, component (f) is present from about zero to about 5%, and component (g) is present from about 0.01 to about 80%.

7. The method of claim 1 wherein, said polymeric stiffening agent is substantially a material selected from at least one of the group consisting of acrylonitrile butadiene styrene, polyvinyl chloride, a cellulosic resin, styrene resins, phenolic resins, a $C_2$–$C_4$ polyolefinic polymer material, an ethylene-ethyl acrylate copolymer, ethylene vinyl acetate, a thermoplastic ethylene-propylene copolymer, and an acrylic resin, said plasticizing agent is a compatible non-staining, non-discoloring plasticizer and is substantially a material selected from at least one of the group consisting of naphthenic oils, low molecular weight polyester type plasticizers, petroleum resins, coal tar compound plasticizers, and paraffinic plasticizers.

8. The method of claim 1 wherein, said curing agent is substantially a material selected from at least one of the group consisting of a sulfur curing agent, a peroxide curing agent, a phenol curing agent, a quinone curing agent, and an amino type curing agent.

9. The method of claim 1 wherein, said filler material is substantially a material selected from at least one of the group consisting of a carbon material, a carbonate, clays, sulfates, fiberglass, fibrous materials, and silicas.

10. The method of claim 8 wherein, said polymeric stiffening agent is substantially a material selected from at least one of the group consisting of acrylonitrile butadiene styrene, polyvinyl chloride, a cellulosic resin, styrene resins, phenolic resins, a $C_2$–$C_4$ polyolefinic polymer material, an ethylene-ethyl acrylate copolymer, ethylene vinyl acetate, a thermoplastic ethylene-propylene copolymer, and an acrylic resin, said plasticizing agent is a compatible non-staining, non-discoloring plasticizer and is substantially a material selected from at least one of the group consisting of naphthenic oils, low molecular weight polyester type plasticizers, petroleum resins, coal tar compound plasticizers, and paraffinic plasticizers.

11. A method of manufacturing a flexible paintable rubber product, comprising the steps of:

formulating a composition comprising, percentages being by weight, a. about 15 to about 90% of a cross-linkable rubber material selected from at least one of the group consisting of, styrene butadiene rubber, polybutadiene rubber, and isoprene rubber, said rubber material also including up to 50% of ethylene-propylene diene monomer rubber or neoprene rubber, b. zero to about 40% of a polymeric stiffening agent for providing a high flex modulus for the cured composition, c. about 0.01 to about 50% of a plasticizing agent, said plasticizing agent is a compatible non-staining, non-discoloring plasticizer and is substantially a material selected from at least one of the group consisting of naphthenic oils, low molecular weight polyester type plasticizers, petroleum resins, coal tar compound plasticizers, and paraffinic plasticizers, d. zero to about 5% of an accelerating agent, e. 0.01 to about 10% of a curing agent, f. zero to about 10% of an activating agent, g. about 0.01 to about 80% of a filler material, and forming the product by molding said composition and curing the product at a temperature between about 275° and about 600° F for a residence time period between about 45 minutes and about ¼ minute, preparing a clean surface on the molded product, applying a flexible color stable colored paint coating to the product.

12. The method of claim 11 further characterized as including, a flexible primer paint coating composition on the product, underneath said flexible color stable colored paint coating layer.

13. The method of claim 11 wherein, said colored paint coating layer being selected from at least one resin coating material from the group consisting of a urethane resin, an acrylic resin, and a polyester resin.

14. The method of claim 12 wherein, said colored paint coating layer being selected from at least one resin coating material from the group consisting of a urethane resin, an acrylic resin, and a polyester resin.

15. The method of claim 11 wherein, said preparing of a clean surface includes treating the surface to be painted by a surface treatment selected from at least one of the group consisting of halogenation treatment, ozone treatment, ultraviolet treatment, electronic treatment or flame treatment.

16. The method of claim 11 wherein, said preparing of a clean surface includes activating the surface to be painted by a surface treatment selected from the group consisting of chlorination treatment, ozone treatment, electronic treatment or flame treatment.

17. The method of claim 15 wherein, said treatment is by chlorination.

18. The method of claim 11 wherein, said rubber material includes less than 15% of ethylene-propylene diene monomer rubber or neoprene rubber.

19. The method of claim 11 wherein, component (b) is present from about zero to about 25%, component (c) is present from about 0.01 to about 35%, component (d) is present from about zero to about 3%, component (e) is present from about 0.05 to about 5%, component (f) is present from about 0.01 to about 5%, and component (g) is present from about 0.01 to about 50%.

20. The method of claim 11 wherein, component (a) is present from about 25 to about 60%.

21. The method of claim 15 wherein, said colored paint coating layer means being selected from at least one resin coating material from the group consisting of a urethane resin, an acrylic resin, and a polyester resin.

22. The method of claim 11 wherein, component (a) is present from about 30 to about 55%, component (b) is present from about zero to about 20%, component (c) is present from about 1 to about 15%, component (d) is present from about 0.01 to about 3%, component (e) is present from about 0.5 to about 3%, component (f) is present from about 0.1 to about 3%, and component (g) is present from about 1 to about 50%.

23. The method of claim 11 wherein,
said curing agent is substantially a material selected from at least one of the group consisting of a sulfur curing agent, a peroxide curing agent, a phenol curing agent, a quinone curing agent, and an amino type curing agent.

24. The method of claim 11 wherein,
said filler material is substantially a material selected from at least one of the group consisting of a carbon material, a carbonate, clays, sulfates, fiberglass, fibrous materials, and silicas.

25. The method of claim 16 further characterized as including,
a flexible primer paint coating composition on the product, underneath said flexible color stable colored paint coating layer.

26. The method of claim 22 wherein,
said filler material is substantially a material selected from at least one of the group consisting of a carbon material, a carbonate, clays, sulfates, fiber glass, fibrous materials, and silicas.

27. The method of claim 11 wherein,
said forming step is carried out by continuously extruding the rubber product.

28. The method of claim 26 wherein,
a textured surface pattern is continuously formed in the product after extruding and prior to curing.

29. The method of claim 11 wherein,
said steps of forming, curing, preparing the clean surface, and applying the color stable paint coating, are all carried out in a continuous operation.

* * * * *